(12) United States Patent
Powell

(10) Patent No.: US 7,850,121 B2
(45) Date of Patent: Dec. 14, 2010

(54) ENHANCED RUDDEVATOR FOR IMPROVED AIR REFUELING BOOM FLIGHT CONTROL

(75) Inventor: Arthur G. Powell, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 11/871,939

(22) Filed: Oct. 12, 2007

(65) Prior Publication Data

US 2009/0095843 A1    Apr. 16, 2009

(51) Int. Cl.
*B64D 39/00*    (2006.01)

(52) U.S. Cl. .................................................. 244/135 A

(58) Field of Classification Search .............. 244/135 A
See application file for complete search history.

(56) References Cited

U.S. PATENT DOCUMENTS

| | | | | |
|---|---|---|---|---|
| 2,663,523 A |   | 12/1953 | Leisy | |
| 2,670,913 A | * | 3/1954 | Thomas et al. | 244/135 R |
| 2,859,002 A |   | 11/1958 | Leisy | |
| 2,949,265 A |   | 8/1960 | Person | |
| 2,960,295 A | * | 11/1960 | Schulze | 244/135 A |
| 4,072,283 A | * | 2/1978 | Weiland | 244/135 A |
| 4,129,270 A | * | 12/1978 | Robinson et al. | 244/135 A |
| 4,150,803 A | * | 4/1979 | Fernandez | 244/135 A |
| 4,231,536 A | * | 11/1980 | Ishimitsu et al. | 244/135 A |
| 4,377,267 A | * | 3/1983 | Haworth | 244/199.4 |
| 4,519,560 A |   | 5/1985 | Ishimitsu et al. | |
| 4,586,683 A | * | 5/1986 | Kerker | 244/135 A |
| 5,582,364 A | * | 12/1996 | Trulin et al. | 244/3.29 |
| 5,785,276 A | * | 7/1998 | Ruzicka | 244/135 A |
| 5,996,939 A |   | 12/1999 | Higgs | |
| 6,420,694 B1 | * | 7/2002 | Greenwood | 250/221 |
| 6,513,754 B1 | * | 2/2003 | Grove | 244/35 A |
| 6,651,933 B1 | * | 11/2003 | von Thal et al. | 244/136 |
| 6,837,462 B2 | * | 1/2005 | von Thal et al. | 244/135 A |
| 7,147,186 B2 | * | 12/2006 | Adelson | 244/135 A |
| 2007/0023575 A1 | * | 2/2007 | von Thal et al. | 244/135 A |

* cited by examiner

*Primary Examiner*—Timothy D Collins
*Assistant Examiner*—Justin Benedik
(74) *Attorney, Agent, or Firm*—Yee & Associates, P.C.; Euclid Woo

(57) ABSTRACT

In-flight fuel transfer from one aircraft to another aircraft or aerial refueling can extend the flight duration of a receiver aircraft and thereby increase its operational range and/or effectiveness by enabling it to fly farther or for longer duration without returning to the ground. Improved aerial fuel transfer is disclosed in connection with a method and system for in flight transfers of fuel from one aircraft to another. Enhanced fuel transfer operations including boom control are disclosed.

9 Claims, 12 Drawing Sheets

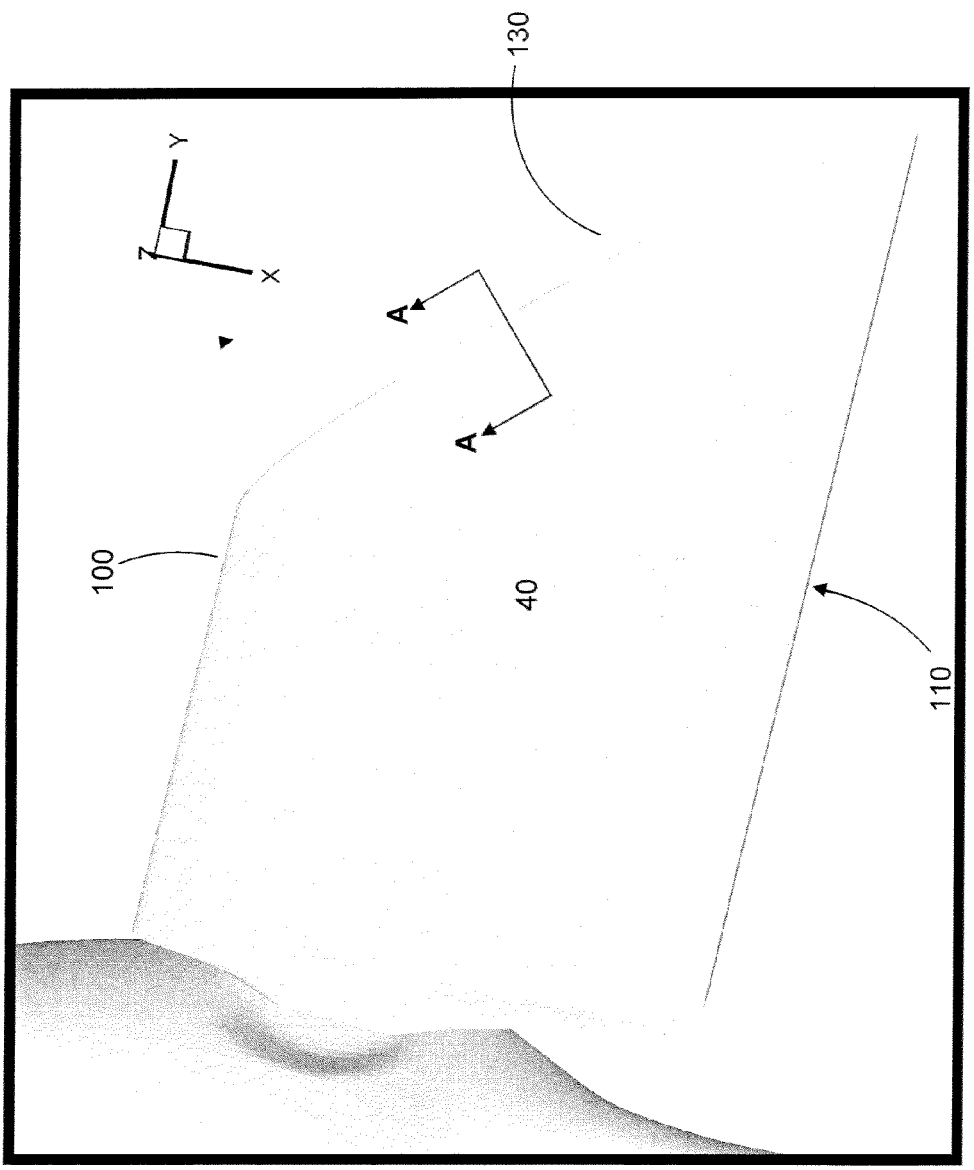

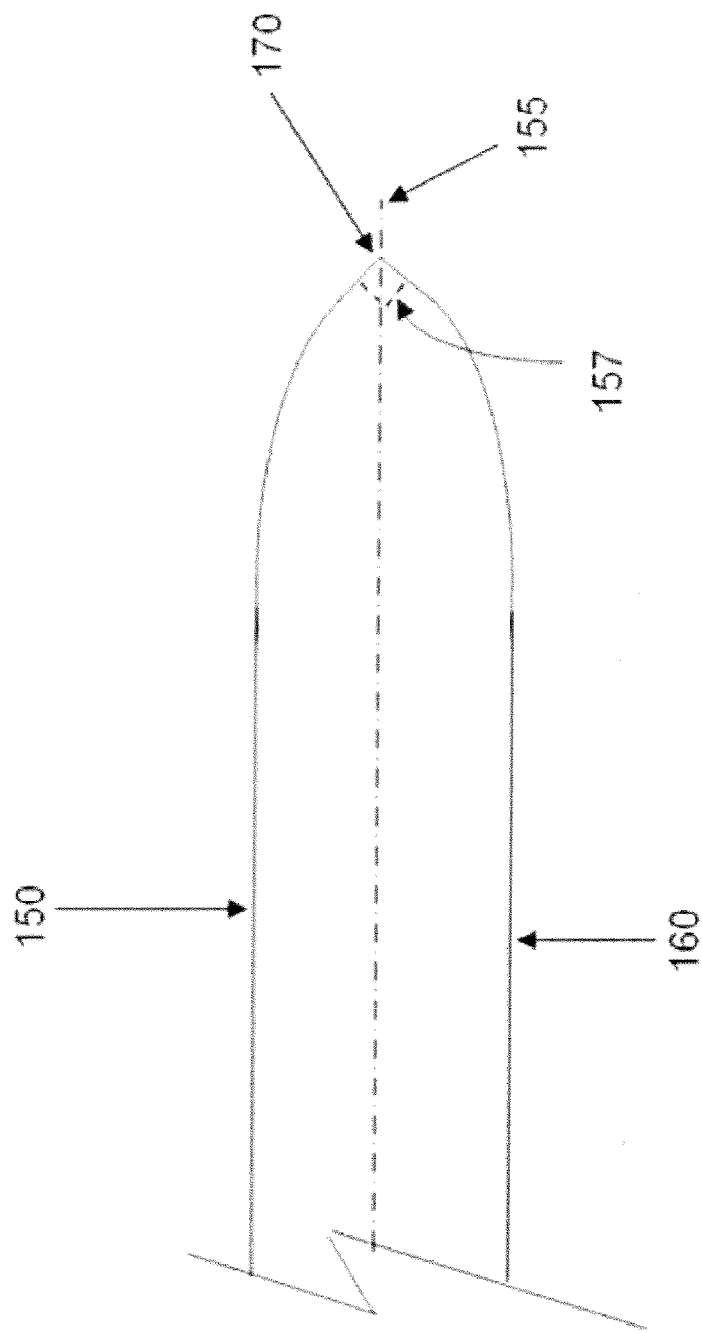

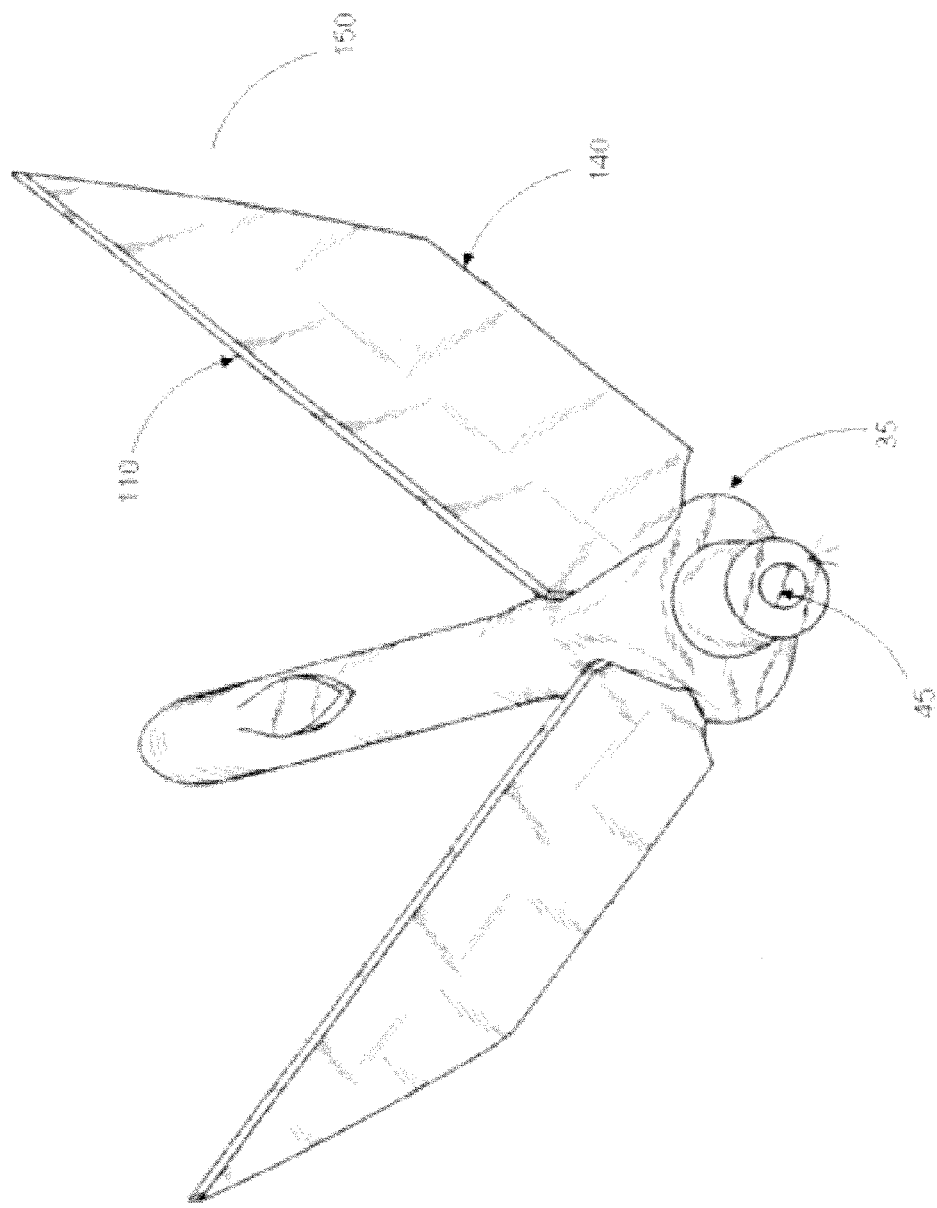

Fig. 10a and 10b
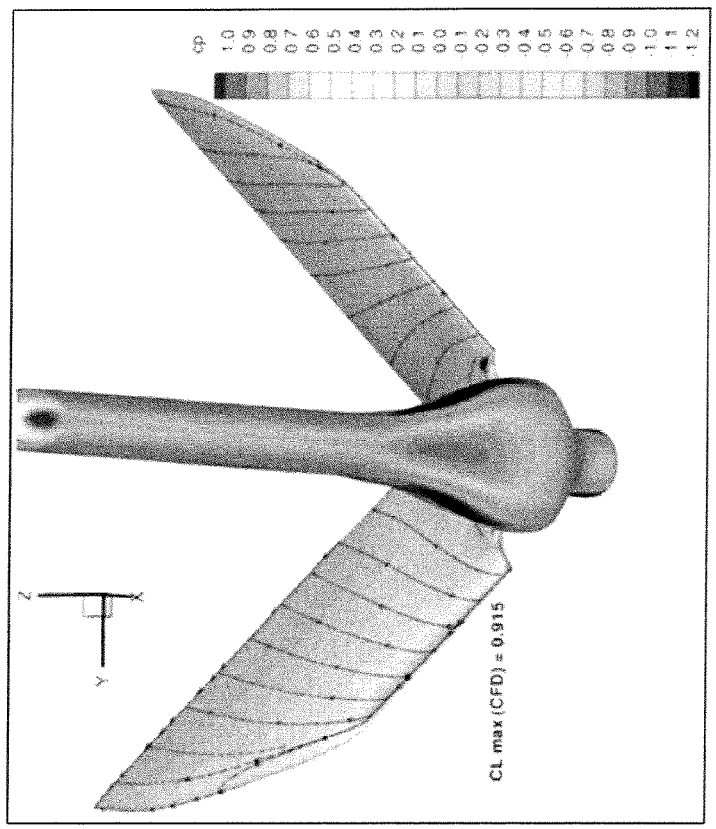
Figure 10 b
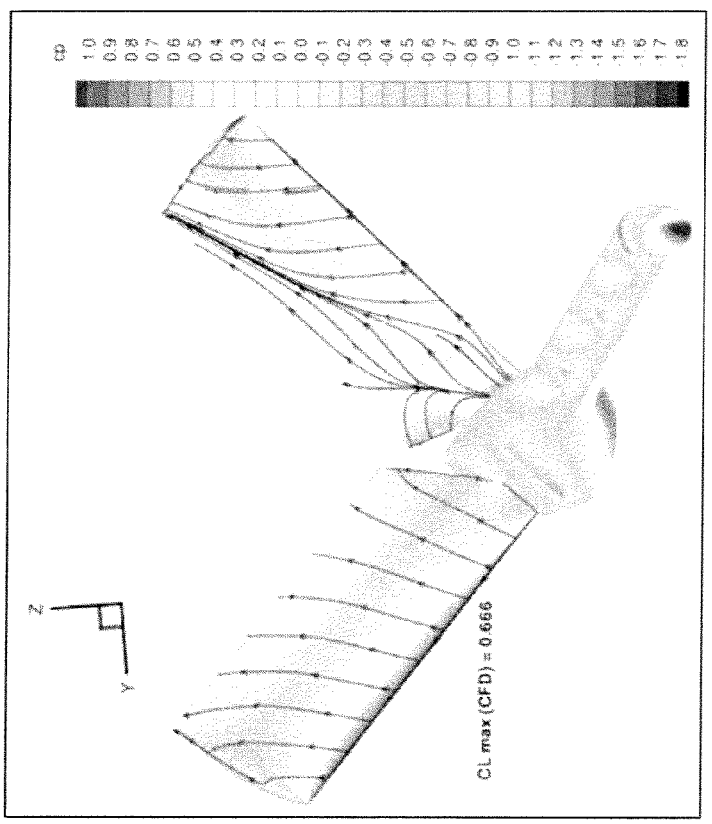
Figure 10 a

Fig. 11a and 11b
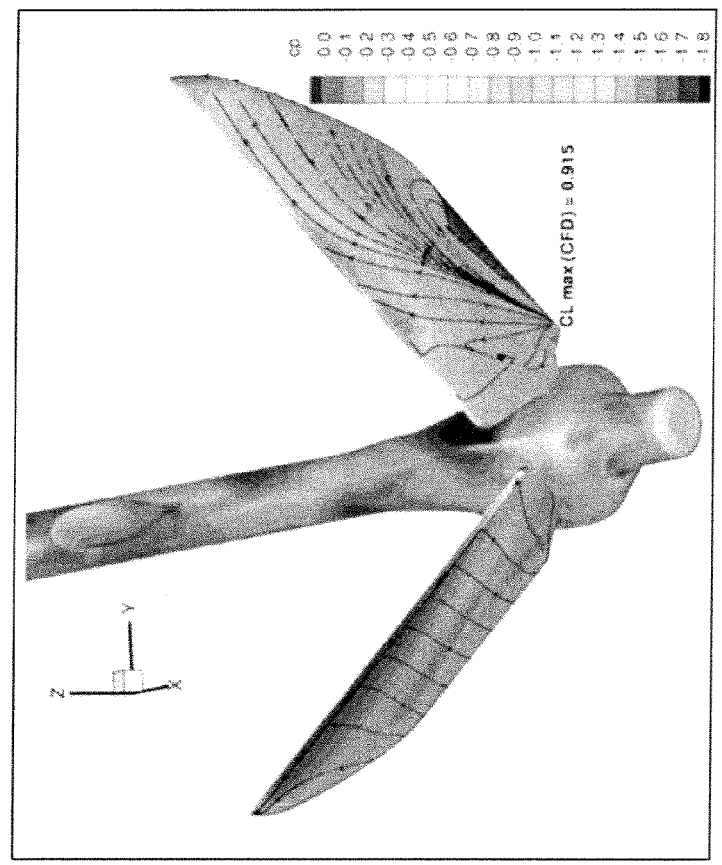
Figure 11 b
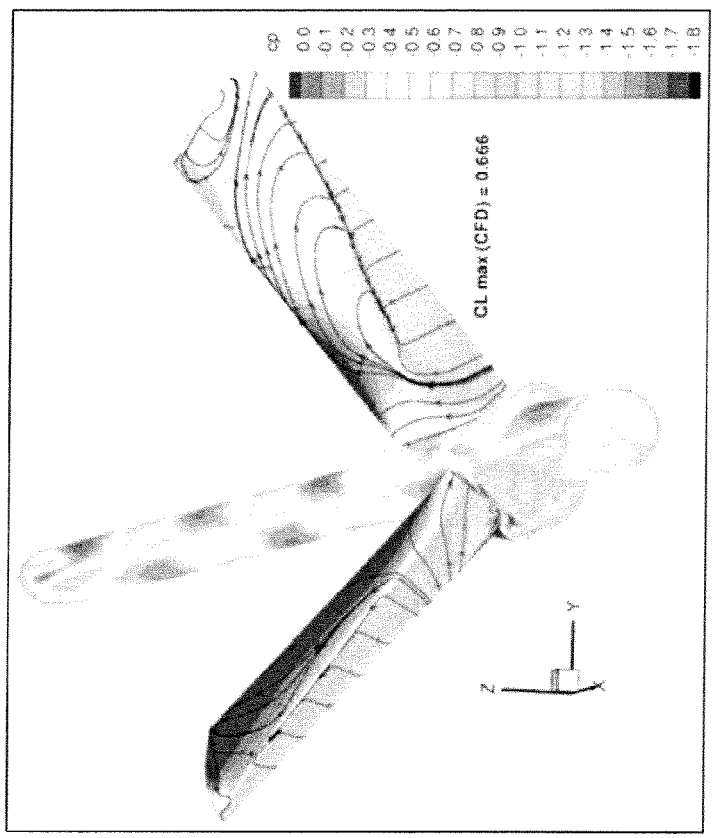
Figure 11 a

ENHANCED RUDDEVATOR FOR IMPROVED AIR REFUELING BOOM FLIGHT CONTROL

TECHNICAL FIELD

An improved aerial fuel transfer operation is disclosed in connection with a method and system for the in-flight transfer of fuel from one aircraft to another aircraft. An improved boom type aerial refueling system and advanced aerodynamic boom control system is used to support the improved aerial fueling transfer operation.

BACKGROUND

A boom type aerial refueling system is used in a military aerial tanker aircraft known as the Boeing KC-135. This boom is supported from the rear lower surface of aircraft via a mount that is free to pivot about a fixed vertical axis for free pivotal movement in a sideward or azimuth direction. The boom is also supported for free pivotal movement about a lateral axis for up and down elevation movement. The boom contains a telescoping tube or duct with a nozzle for engagement with a receiving aircraft. The telescoping tube can move in and out of the boom to adjust for fore and aft movement of the receiving aircraft. A pair of aerodynamic control surfaces referred to as ruddevators are coupled to the boom to move the boom about the vertical and lateral axes. For instance when the ruddevators are moved collectively to a negative angle-of-attack, the boom will be moved downwardly; and a differential change in the angle-of-attack of the ruddevators will move the boom sidewardly.

The ruddevator angles of attack are controlled by actuators, which can be driven by pantographing cable or fly-by-wire control systems. The control systems may be operated by a variety of control signals including electrical, hydraulic, optical or mechanical signals from a boom operator. The operator is typically a human controlling the ruddevator position by providing the control signals, but the operator may also be an autonomous system relying on sensors monitoring the position of the two aircraft and the position of the boom and using a logic system providing the control signals to the control system. The control system commands the actuators to move the ruddevators and reposition the refueling boom. An advanced actuator control system may automatically position the ruddevators to adjust to movements of the boom that are induced by movement of the receiver aircraft instead of a boom operator's control. For example, when engaged with the boom the receiver aircraft can move the boom in elevation and cause the ruddevators to automatically adjust. Similarly when the receiver aircraft pulls the boom off to one side, the ruddevators will adjust accordingly. These adjustments to the ruddevator alleviate the forces that would be imposed on the boom and ruddevators as a result of the boom being displaced without any control input from the boom operator.

When performing an aerial refueling mission the rate of fuel transfer through the tanker boom (referred to as off-load) to the receiving aircraft is one of the limiting factors in off-load efficiency. Continuous positive contact with the boom and the receiving aircraft ensures fuel transfer. A refueling boom exhibiting substantially aligned refueling connection and positive control can increase positive contact duration between the tanker and the receiving aircraft and thus reduce the refueling mission time and ensure maximum and efficient fuel transfer. While aerial refueling using a boom-type fuel transfer system offers greater fuel transfer rates over other fuel transfer systems such as hose and drogue types, nevertheless it is desirable to further improve and more particularly increase and extend the aerodynamic range and performance of the existing boom.

SUMMARY

Methods, systems and component parts for aerial refueling of aircraft that transfers fuel from other aircraft to another are provided. More particularly, the disclosed aerial refueling system has a greater operating range or envelope and can more efficiently and continuously transfer fuel and for longer durations. These methods, systems and components facilitate fuel delivery over a wider range of operating conditions including weather and flight conditions.

In a preferred embodiment, a method of refueling an aircraft may include deploying a refueling boom from a tanker or fuel carrying aircraft and connecting with a second or receiver aircraft to be refueled. The method may further include moving or repositioning the boom as needed based on the relative movement of the two aircraft. The method may also further include accurately moving or repositioning the boom by controlling the angle of a pair of aerodynamic ruddevators attached to the boom. The ruddevators may have aerodynamic features that include a chine, a raked wing tip, a sweep angle and a truncated trailing edge.

An aerodynamic control device in accordance with one embodiment may include a wing body having a thickness, a sweep angle, a raked wing tip including a chine and a truncated trailing edge such that when positioned at a extreme azimuth angle at a transonic airspeed a vortex will form on the raked wing tip producing a lifting force on the ruddevator.

In another aspect of the preferred embodiment, the aerodynamic control system includes a pair of ruddevators mounted on a refueling boom via shafts, the ruddevators being controlled by an operator within the tanker aircraft. Each ruddevator comprises an airfoil configuration that has a leading edge, a raked wing tip, a trailing edge and an inboard or root edge with a shaft securing the ruddevator to the boom.

In another aspect of the preferred embodiment, the ruddevator incorporates a chine running along the leading edge of the raked wing tip. The chine may be an intersection of two surfaces forming line running along the approximate centerline of the wingtip where the upper wing surface and lower wing surface conjoin at an angle of approximately 90 degrees.

In another aspect of the preferred embodiment, the ruddevator may include a wing body having a thickness, a sweep angle, a truncated trailing edge and a raked wing tip including a chine such as to initiate vortex creation when the ruddevator is positioned with low angles of attack allowing air flow to depart from the raked wing tip and increase the lift generated on the ruddevator.

In another aspect of the preferred embodiment, the boom is attached to a tanker aircraft in a two-axis configuration such that it can be moved +/−15 degrees in the azimuth direction from the tanker aircraft and 20 to 40 degrees in the vertical direction. The boom may include a housing that contains a duct to transport fuel. The boom may further extend a rigid duct from the housing containing a nozzle for coupling to an aircraft configured to receive fuel via the refueling boom.

In another aspect of the preferred embodiment the boom may include an extended body portion to couple aerodynamic control devices. The extended body portion may contain actuators or devices to control the movement of the ruddevators based on the inputs from the control operator.

In another embodiment, a method for refueling an aircraft may include deploying from a tanker aircraft a refueling boom that includes a pair of ruddevators and controlling the location of the boom throughout an envelope that is defined by movement of the boom 20 to 40 degrees in the vertical direction and +/−15 degrees in the azimuth direction.

In further embodiments, the method may further include coupling a nozzle located on the refueling boom to a receptacle attached to a receiving aircraft. The method may also include positioning the boom by moving a pair or ruddevators, each ruddevator having a wing body having a thickness, a sweep angle, a raked wing tip including a chine and a truncated trailing edge to maintain nozzle alignment and contact between a refueling tanker and a receiver aircraft and minimize and preferably achieve an approximately zero force on the boom while it is coupled to the receiving aircraft in order to maintain continuous fuel transfer between the tanker and the receiving aircraft.

Other aspects and features of the subject air to air refueling system for delivering fuel to or receiving fuel from other aircraft will be come apparent to those of ordinary skill in the art upon review of the following non-limited detailed description in conjunction with the accompanying figures.

BRIEF DESCRIPTION OF THE DRAWINGS

FIG. 8 illustrates an embodiment of a ruddevator as viewed from the top of the upper surface.

FIG. 8a illustrates a cross-section of one embodiment of a ruddevator along section A-A of FIG. 7 illustrating the features along the ruddevator wingtip.

FIG. 9 illustrates an embodiment of ruddevators attached to a refueling boom as viewed from behind the refueling boom.

FIGS. 10a and 10b provide CFD data showing airflow and pressure coefficients for a conventional ruddevator system (FIG. 10a) and a preferred embodiment of a ruddevator (FIG. 10b) along the upper surface, or pressure surface of the ruddevator, when the ruddevator is forcing the boom down in elevation and over in azimuth.

FIGS. 11a and 11b provide CFD data showing airflow and pressure coefficients for a conventional ruddevator system (FIG. 11a) and a preferred embodiment of a ruddevator (FIG. 11b) along the lower surface, or suction surface of the ruddevator, when the ruddevator is forcing the boom down in elevation and over in azimuth.

DETAILED DESCRIPTION

Figure 1:
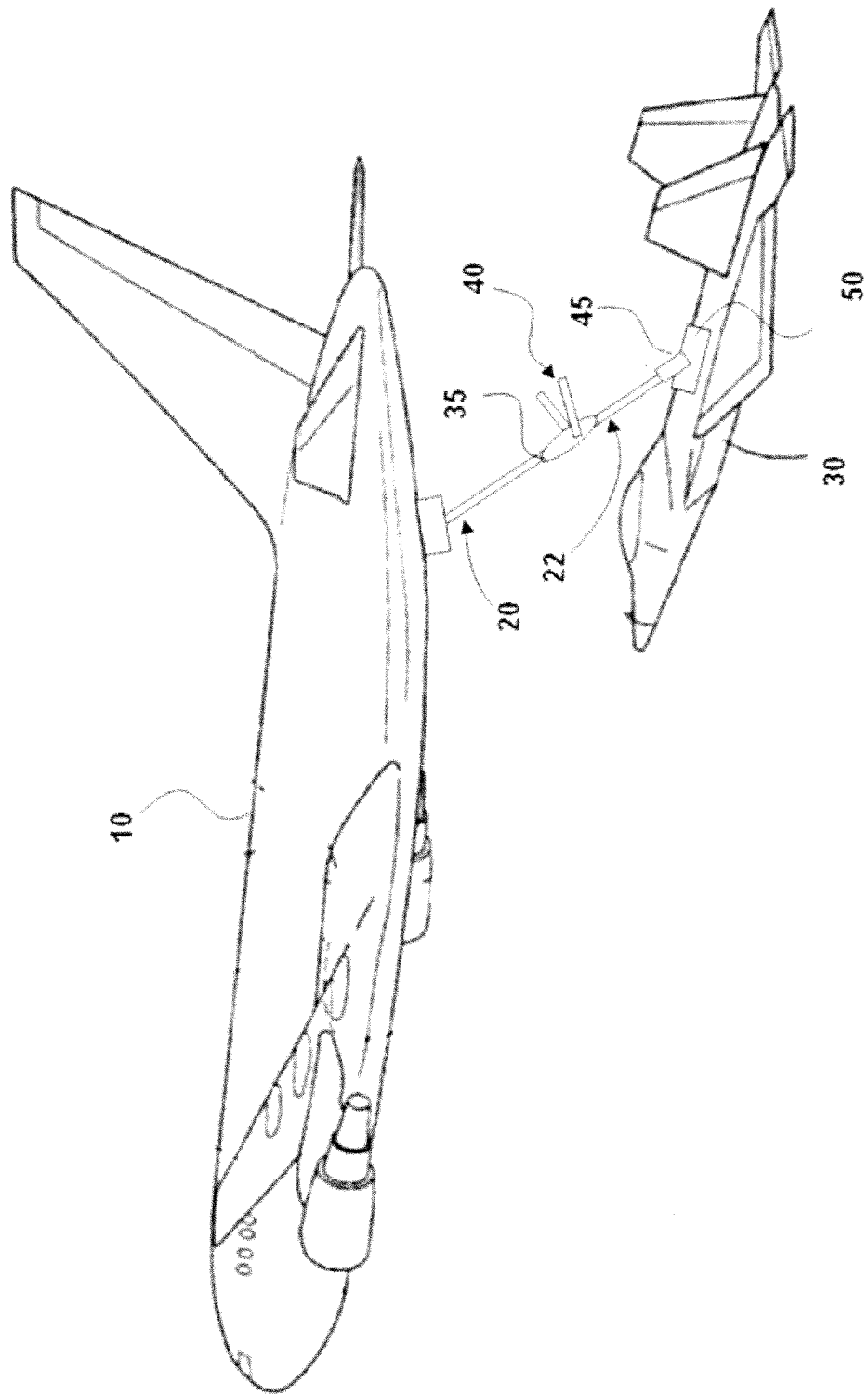
FIG. 1 illustrates a tanker aircraft refueling a receiver aircraft in accordance with preferred embodiments hereof.

The following description enables a person skilled in the art to practice an improved and efficient aerial fuel transfer operation to transfer fuel in accordance with the best modes contemplated by the inventor as set forth herein. Various modifications, changes and enhancements, however, will remain readily apparent to those skilled in the art, since this disclosure, in addition to disclosing the structure of aerial refueling systems, teaches the generic principles of enhanced air to air fuel transfer to enable those skilled in the art to fully practice an improved method of aerial fuel transfer and the system for delivering fuel from an aerial refueling tanker aircraft to receiving aircraft.

Effective boom type fuel transfer involves a series of continuous high volume and preferably, uninterrupted fuel transfers executed in a consistent and efficient manner. Efficient air-to-air fuel transfer operations rely on high quality situational awareness and precise operator control and execution. Situational awareness can include mission deployment plans, communications between aircraft, visual observation and remote vision and control systems. This information can indicate the number of aircraft requiring fuel, the fuel needs of individual aircraft, their positions, equipment capacities and capabilities. Some of this information allows the mission commander to plan the location, order and quantities of fuel transfer. More localized information regarding the relative positions of the aircraft and respective components can be provided by a remote vision system. The best available information enables the boom operator to identify the immediate needs of the fuel transfer operation. Efficient execution on these needs requires efficient and high quality equipment.

Current refueling booms are compatible with properly equipped receiver aircraft and offer high reliability and available fuel-transfer rates capable of transferring more than 900 gallons of fuel per minute. New generation boom controls are faster, more accurate, more responsive and employ an advanced fly-by-wire architecture to reduce operator workload. One example of a new refueling technology is the Automatic Load Alleviation System (ALAS). which automatically maintains boom alignment to the receiver aircraft to ensure consistent operation. An example of this system can be found In U.S. Pat. No. 6,651,933 to von Thal et al., Boom Load Alleviation Using Visual Means.

Another example of new refueling technology is a state-of-the-art boom operator system such as the Remote Vision System (RVS) offers unprecedented remote vision capability. The RVS is a station that is located on the aircraft and includes features such as a 3-D view of the receiving aircraft and a 185-degree field of view, and provides on-screen symbology of information to the operator. Additionally, the advanced digital video processing and high-definition stereoscopic display reduce glints. glares and shadows and improve air refueling operations. RVS also includes features that enhance low-light refueling missions such as dawn, dusk and night. An example of this system can be found in U.S. application. US-2007-0023575-A1, Von Thal, Et at., Vision System and Method Incorporating Graphics Symbology For Use In A Tanker Refueling System.

Accordingly an improved aerial refueling boom with performance capabilities tailored to the aircraft and associated control system is provided. Operation of this aerial refueling boom allows a boom operator in an aerial refueling tanker aircraft to more easily control the boom. particularly at the lower extreme and outer edges of the refueling envelope, sometimes referred to as the azimuth or lateral angles, and to more readily maintain uninterrupted refueling contact with the receiver aircraft It is desirable to improve the fuel transfer performance of the boom type aerial refueling system. Greater operating requirements are imposed by the ever increasing speeds and altitudes required to refuel the modern high speed military aircraft. In order to provide a boom aerial refueling system that permits fuel transfer between the tanker aircraft and the receiver aircraft, at the airspeeds and altitudes desirable for the receiver aircraft, there must be adequate aerodynamic control forces available from the airfoil surfaces flying the boom. Further, the boom must exhibit sufficient maneuverability to fly throughout a predefined 3-dimensional envelope large enough to substantially enclose the movements of the receiver aircraft.

It is also desirable is to provide a refueling boom that is completely and continuously controllable for the specified speed and altitude range throughout the design disconnect envelope, by improving the effectiveness of the aerodynamic control forces generated by the ruddevator control surfaces of the refueling boom. Currently, refueling disconnects are usually initiated by the boom operator well within the automatic disconnect envelope limits, because of limited boom aerodynamic control power. Further, the aerodynamic control force capability of the ruddevator surfaces should not be compromised, either in the presence of the flow field effects of wide body receiver type aircraft, or at the optimum altitude and airspeed of the receiver aircraft for refueling hook-up.

The boom disconnect envelope is defined as an envelope within which the ruddevators can exert sufficient aerodynamic control force to control boom movement and permit a safe extraction of the boom nozzle from the receiver receptacle if envelope limits are reached or exceeded. In the absence of other solutions, an increase in airspeed of the tanker aircraft beyond that desired for optimum refueling of the future inventory of receiver aircraft, could reduce the boom maneuvering envelope to the point where the refueling operation could be restricted to suit the operation of the boom and the refueling operation could be performed at lower airspeeds which could reduce the altitude and airspeed of receiver aircraft. The range of the receiver aircraft could also be degraded because additional fuel may be consumed in returning to cruise airspeed and altitude after refueling. Collateral issues may include increased vulnerability to weather and third party interception.

One of the inherent aspects of the U.S. Air Force KC-135 refueling tanker's boom ruddevator control system, is that when the boom is moved over to one side of the azimuth envelope, a large restoring lateral moment is generated by the boom. This results in high aerodynamic control force requirements of the ruddevators in maintaining that extreme azimuth position. Further, at this extremity of the azimuth envelope, the wake flow from the boom partially blanks out the airflow over one of the ruddevators, reducing the maximum control force available. It could be said that with the KC-135 boom having a fixed vertical and horizontal gimbal geometry, that the ruddevators lack sufficient control authority to fly the boom out to the extremities of the desired envelope. A more detailed explanation of the manner in which a boom aerodynamic control system operates is disclosed in U.S. Pat. No. 2,960,295 to Schulze and U.S. Pat. No. 4,129,270 to Robinson et al.

Large restorative aerodynamic yaw moment creates large lateral aerodynamic control power required by the generally known ruddevator surfaces. The aerodynamic performance of the ruddevator control system can be improved either alone or in combination with other improvements such as aerodynamic yaw moment reduction system of Robinson et al. Improvements in the lateral displacement capability of the boom can enhance boom movement and improve the efficiency of aerial refueling operation.

Continuous aerodynamic control force capability throughout the normal refueling envelope is desirable. Further, this aerodynamic control force must be sufficient to maneuver the boom out of the path of an over-running receiver aircraft. Sufficient vertical maneuverability must exist to fly the boom at least to the horizon to evade receiver aircraft.

The lateral movement of the boom is equally important to its vertical movement when evading an over-running receiver aircraft. Over-runs of a receiver aircraft with the boom at the inner lower corner of the refueling envelope, have resulted in boom and receptacle damage and receiver aircraft over-runs with the boom at the inner tipper corner of the refueling envelope have resulted in more serious cases of tanker and receiver aircraft damage. The KC-135 boom operation can be enhanced. An ability to maintain the existing width of the automatic limits for the refueling disconnect envelope during all combinations of boom extension and elevation angles would produce a disconnect envelope with increased safety margins over the current capabilities of the KC-135 boom.

The improved aerodynamic control system boom produces a refueling envelope with increased scope. The service history of the talker aircraft refueling operations, indicates that a design disconnect envelope which has an elevation capability of 20 degrees to 40 degrees is acceptable provided that there is sufficient aerodynamic boom control power available for full utilization of these limits.

The performance improvement of the ruddevators can be further enhanced with a boom having a gimballing arrangement that utilizes a fixed elevational axis with a tilting or canting azimuth axis as is discussed in Robinson et al. above. This combined gimbaled articulation produces a boom rolling action as a function of the change in inclination of the azimuth angle; and the advantage of introducing a roll angles results in an increase in the effectiveness of the ruddevators and a reduction in boom yaw moment and thereby provides a larger controlled boom refueling envelope.

An increase in the size of the usable refueling envelope may permit the larger receiver aircraft greater maneuvering deviations without refueling disconnects. According to experienced opinions, the refueling of present known large receiver aircraft from tanker type aircraft like the KC-135, could be interrupted once by an inadvertent disconnect during a twenty minute refueling transfer.

An example of a typical aerial refueling boom comprises a telescoping tube which is attached to the underside of the aircraft fuselage by means of a yoke and trunnion mounting arrangement; and provides the means for transferring fuel from the tanker aircraft to the receiver aircraft while both aircraft are in-flight. Within the tanker aircraft is the boom operator, which maneuvers the boom into contact with a properly equipped receiver type aircraft.

Referring to FIG. 1, an aerial refueling tanker 10 is shown in proximity to a receiver aircraft 30. While FIG. 1 illustrates of tanker aircraft 10 refueling a typical fighter aircraft 30 such as an F22 aircraft, one skilled in the art can appreciate that the tanker 10 can also refuel a number of other types of aircraft including transport aircraft such as a U.S. Air Force C-17 aircraft as well as properly outfitted commercial aircraft. The tanker 10 can also refuel other tanker aircraft to allow a tanker to transfer its remaining fuel to another tanker before leaving its station.

Still referring to FIG. 1, an aerial refueling system may comprise a refueling boom 20 configured to provide efficient transfer of fuel from the tanker aircraft 10 to the receiving aircraft 30. The boom 20 preferably includes a rigid section with a telescoping section 22 that extends from the distal end of the rigid section. The rigid section of the boom 20 may be mounted to the underside of tanker 10. Examples of mounts for such refueling systems are described and shown in FIGS.

2, 6 and 7 of U.S. Pat. No. 5,785,276 to Ruzicka. The boom 20 may further include a telescoping duct 22 which may further include a nozzle 45 for connecting into a receptacle 50 located on the receiving aircraft 30. The boom 20 may also include a housing portion 35 that may further include an aerodynamic control system comprising one or more moveable airfoils (referred to as ruddevators) 40. The telescoping duct 22 of the refueling boom 20 may be a deployable and retractable duct through which fuel is transported from the tanker aircraft to the receiving aircraft. The telescoping portion may be substantially rigid and capable of being stored inside the refueling boom. In a preferred embodiment the refueling boom incorporates a pair of ruddevators 40 that are preferably substantially mirror images of each other and each comprises an airfoil having substantially matching symmetric areas.

Figure 2:
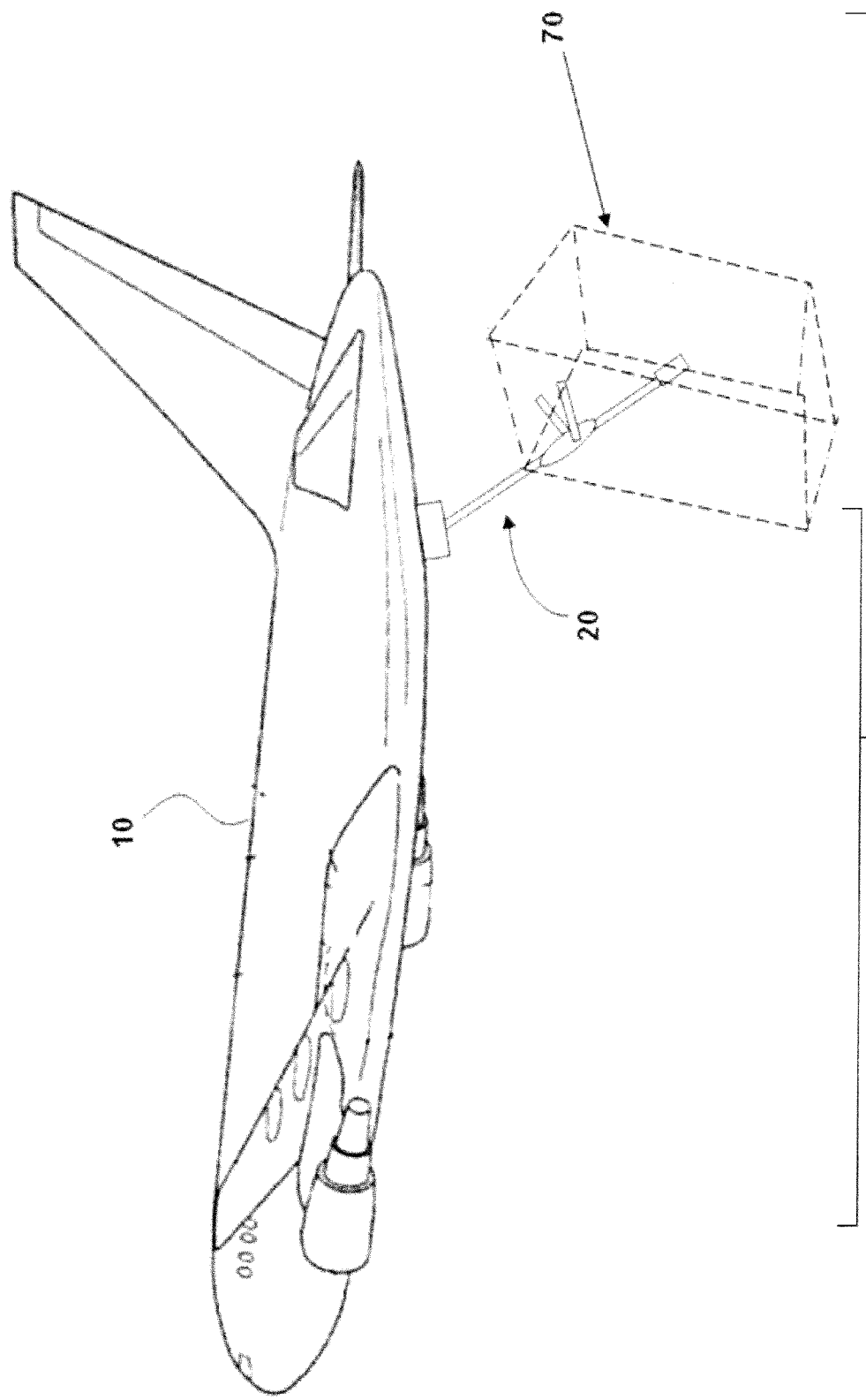
FIG. 2 illustrates a tanker aircraft and a representation of the envelope where a refueling boom can position and effectively perform a refueling operation.

When the boom is not deployed the ruddevators 40 may be stored beneath the rear portion of the aircraft. As the boom 20 is deployed into a preferred operating position (as shown in FIG. 2) approximately 45 degrees below the horizontal flight line, the ruddevators 40 are rotated to interact with the air stream and provide aerodynamic lift to move the boom 20. The ruddevators 40 are preferably positioned on the approximate endpoint of the rigid boom housing and preferably not on the telescoping portion of the boom 22.

Referring to FIG. 2, a preferred embodiment of an improved refueling boom 20 may include an enhanced aerodynamic control system for controlling movement of the boom 20 within a refueling envelope 70. More particularly a preferred method of aerial fuel transfer employs an advanced aerodynamic control system to establish and maintain a stable coupling to a receiving aircraft 30 to improve the efficiency and safety of the fuel transfer operation and more particularly to support an efficient and continuous high volume fuel transfer to a receiving aircraft 30. An advanced aerodynamic control system may include an actuator driven ruddevator 40 that is pivotally attached to a refueling boom 20. The ruddevators 40 are preferably matched to the aerodynamic control system to maximize boom operation. A preferred aerodynamic control system includes a pair of ruddevators 40 that provide lift to the boom. In addition, the control system may include a plurality of actuators to control the movement of the ruddevators 40. The actuators are preferably located within the boom housing 35 protected from the environment and connected in electrical, optical or mechanical communication with the refueling operator. The actuators drive the ruddevators 40, which in turn positions the boom 20, and more particularly, positions the refueling nozzle 45 within the contact envelope 70. As will be explained in more detail below, the current boom 20 has greater operating control and an operating system that allows the operator to fully utilize the capabilities of information provided by the remote vision system to control the boom to initiate, maintain and preferably complete an uninterrupted high volume fuel transfer.

Figure 3:
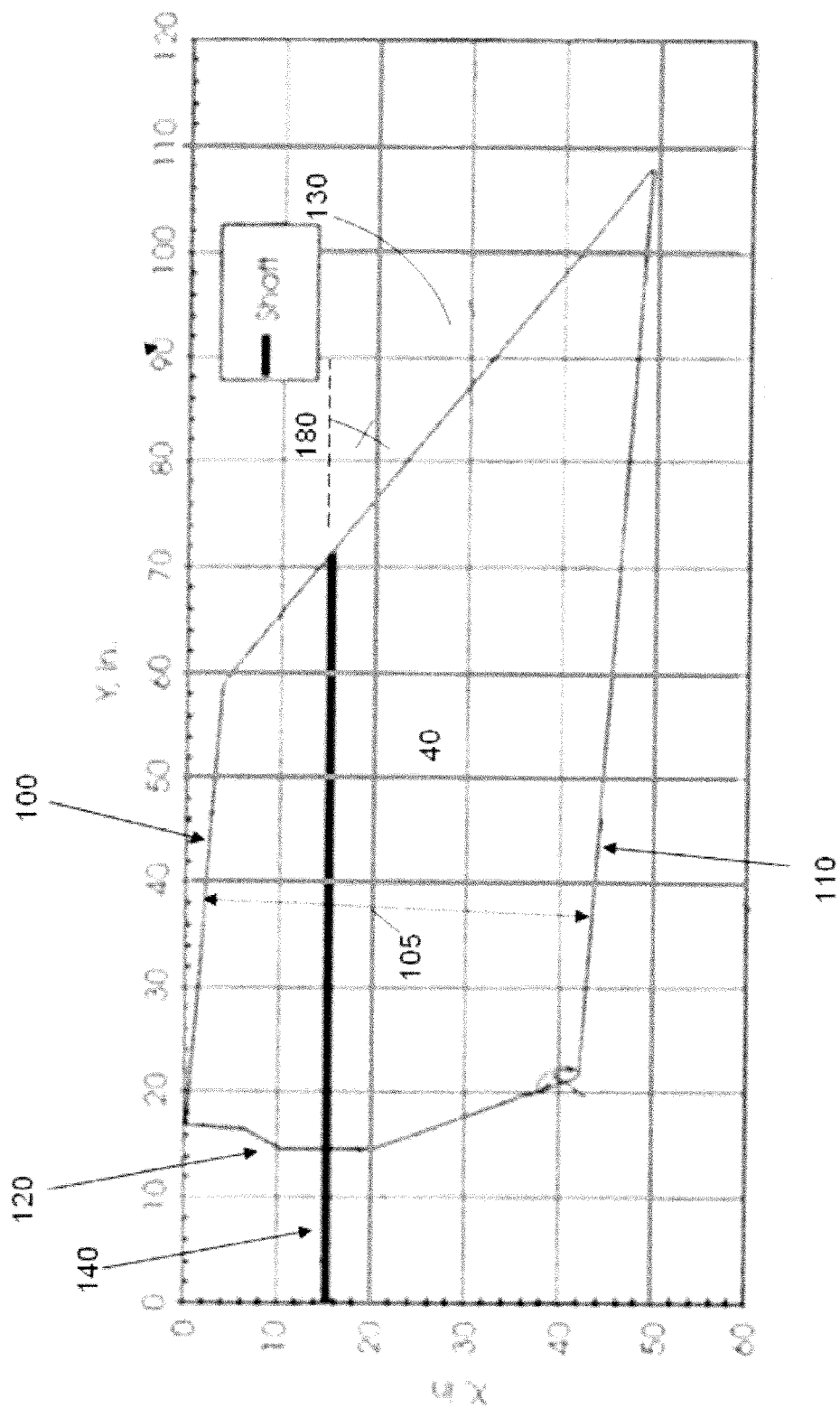
FIG. 3 illustrates a planform view of a preferred embodiment of the ruddevator showing the swept leading edge, the raked wingtip and sweep angle with respect to the control shaft.

FIG. 3 illustrates a planform view of a preferred embodiment of a ruddevator for a refueling boom. A ruddevator may comprise a leading edge 100, a trailing edge 110, a root 120 and a wing tip 130. Each ruddevator 40 may be supported by an actuator shaft 140 having a preferred diameter up to the maximum thickness of the ruddevator and preferably in the range of 85% to 99% the thickness of the ruddevator's maximum thickness and extending internal to the ruddevator a minimum of 25% of the length of the structural span and preferably between 25% to 75% of the length of the structural span. The shaft may be constructed with a high strength material such as high strength alloy steel, titanium or a composite.

Figure 4:
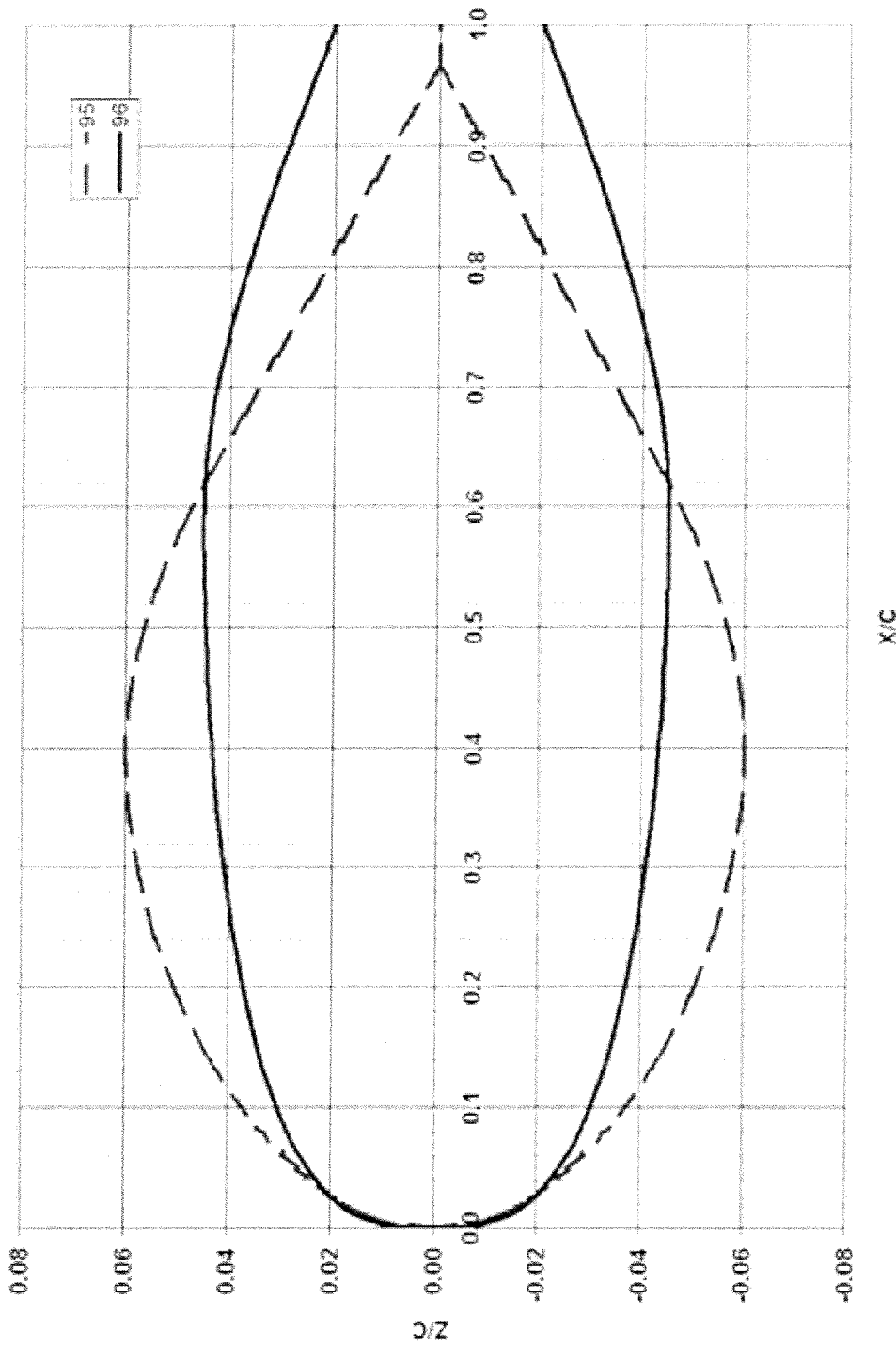
FIG. 4 illustrates a cross-section of an embodiment of a ruddevator as viewed along a portion of the ruddevator with a constant span.

While it is desirable to have a large diameter shaft for strength purposes, this typically requires a thick ruddevator, which can adversely impact ruddevator performance. FIG. 4 shows a cross-sectional comparison of a typical ruddevator 95 and one embodiment of the ruddevator 96. The x-axis of FIG. 4 is percent chord length (x/c) and the y-axis is the ratio of thickness to chord (z/c). The shaft may be inserted into the root of the ruddevator 40 at a location where the center longitudinal axis of the shaft is positioned in the range of 30% to 50% the length of the chord as measured from the leading edge to the trailing edge and preferably at approximately 40% of the chord length. This shaft may be further coupled to an actuator disposed within the housing 35 of the boom 20. The maximum thickness of a conventional ruddevator section shape typically occurs at 35% to 45% of the chord length and is approximately 8% to 12% the thickness of the chord length. The thickness of the actuator shaft is conventionally limited by the thickness of the ruddevator root. A conventional ruddevator may have a shaft located at approximately 7% to 12% the chord length where the local thickness of the ruddevator is between 50% and 70% the total thickness of the ruddevator. In a further embodiment, the ruddevator 40 may have a thickness between approximately 8% to 12% of the chord length and more preferably approximately 8% to 9% of the chord length.

The aerodynamic surfaces of the ruddevators 40 can be characterized by a number of structural parameters. For instance, in one embodiment, a ruddevator 40 as shown in FIG. 3, chord length 105 is the maximum airfoil dimension substantially perpendicular to an unswept leading-edge 100 to trailing edge 110. The chord length may be 35 inches to 45 inches and preferably 41.5 inches. The planform area of the ruddevator 40 may be preferably 15 square feet to 21 square feet and more preferably approximately 18 square feet. A semi-aspect ratio is determined as the exposed planform area divided by the chord length. The preferred airfoil offers a ratio of the chord to the semi-aspect ratio in the range of 1.1 to 2.4 and preferably is approximately 1.5. The term exposed as used herein means that part of an aerodynamic surface that is not buried inside a fuselage, refueling boom, or any other body/structure.

In a further embodiment, the ruddevators include a leading edge and trailing edge that has a sweep angle in the range of 0 to 10 degrees to the actuator shaft 140 and preferably approximately 5 degrees to the actuator shaft 140. As will be discussed in more detail in FIG. 9 below, this sweep modification allows the shaft to emerge from a thicker part of the root airfoil section shape, so an airfoil shape of appropriate thickness can be used.

Referring still to FIG. 3. In a preferred embodiment an improved ruddevator may have a wingtip that is raked and maintains and angle with the incident airflow of 60 to 75 degrees when positioned in the deployed elevation position (approximately 40 degrees from the horizontal flight line of the tanker aircraft). In a further embodiment, the wingtip has a raked angle 180 of between 40 degrees to 50 degrees to the actuator shaft 140 and more preferably 45 degrees to the actuator shaft. More particularly, the rake may begin at a point approximately 40% the total ruddevator length from the root 120 of the ruddevator 40. As will be discussed in more detail in FIGS. 8-11 below, this raked leading edge of the airfoil alters the flow over the ruddevator at high angles of attack, above 7 degrees angle-of-attack at subsonic and transonic conditions, and allows a controlled vortex to form to provide additional lift to the ruddevators.

Referring now to FIGS. 5 through 8, a further aerodynamic enhancement may be provided by truncating the trailing edge

110. Conventional ruddevator airfoils include closed or tapered trailing edges, where the upper and lower surfaces converge to close the airfoil. Airfoils with closed trailing edges exhibit increased drag at higher angles-of-attack. A preferred airfoil includes a truncated trailing edge over substantially the entire expanse of the trailing edge 110. The trailing edge has a thickness approximately in the range of 1% to 3% the chord length and preferably in the order of 2.7% the chord length of the ruddevator. While the truncated trailing edge 110 increases drag at low angle-of-attack, it allows for lower surface curvatures and therefore thicker airfoils to produce aerodynamic forces that are typically seen on thinner airfoils. At Transonic speeds and at higher angles of attack above 3 degrees, a ruddevator with a truncated edge will have less drag than an equivalently thick airfoil with a typical tapered or closed trailing edge. It also has improved buffet characteristics.

Figure 5:
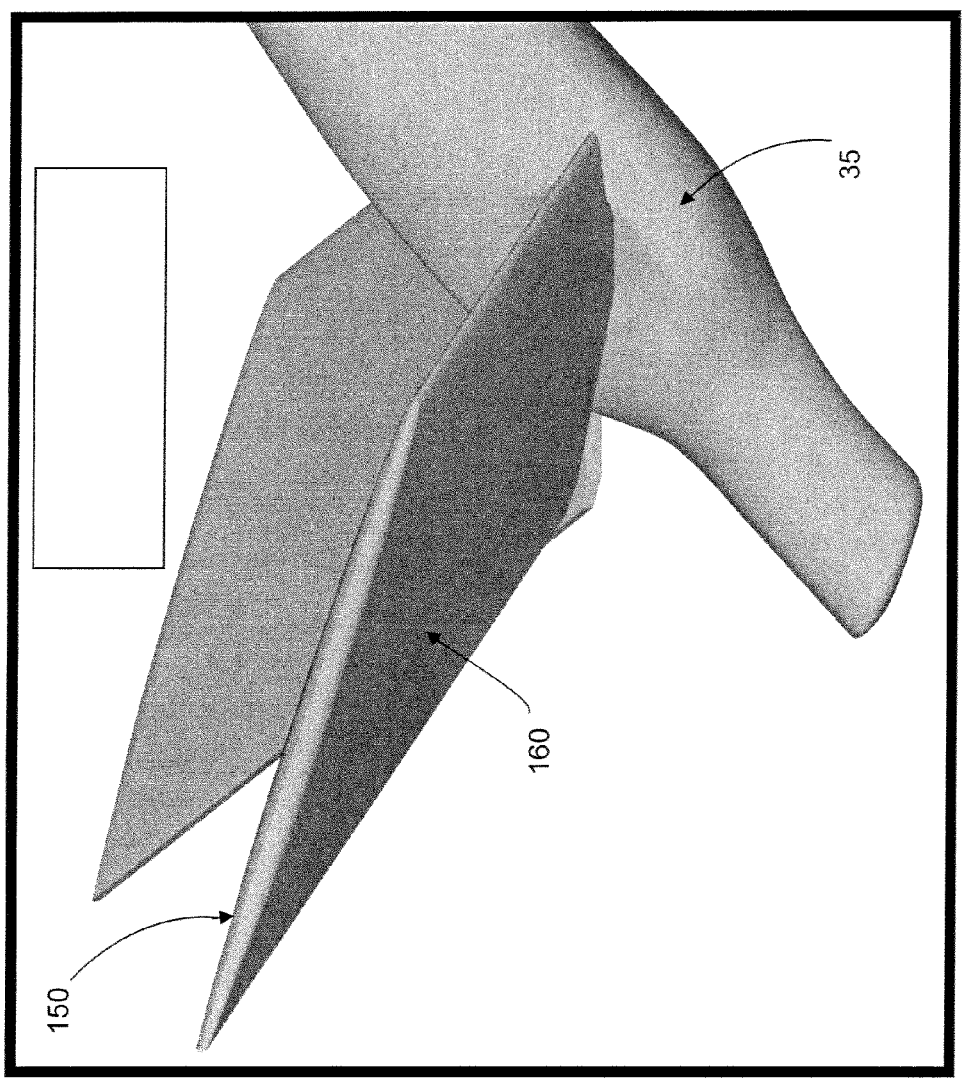
FIG. 5 illustrates an embodiment of two ruddevators attached to an extended housing on a refueling boom.
Figure 6:
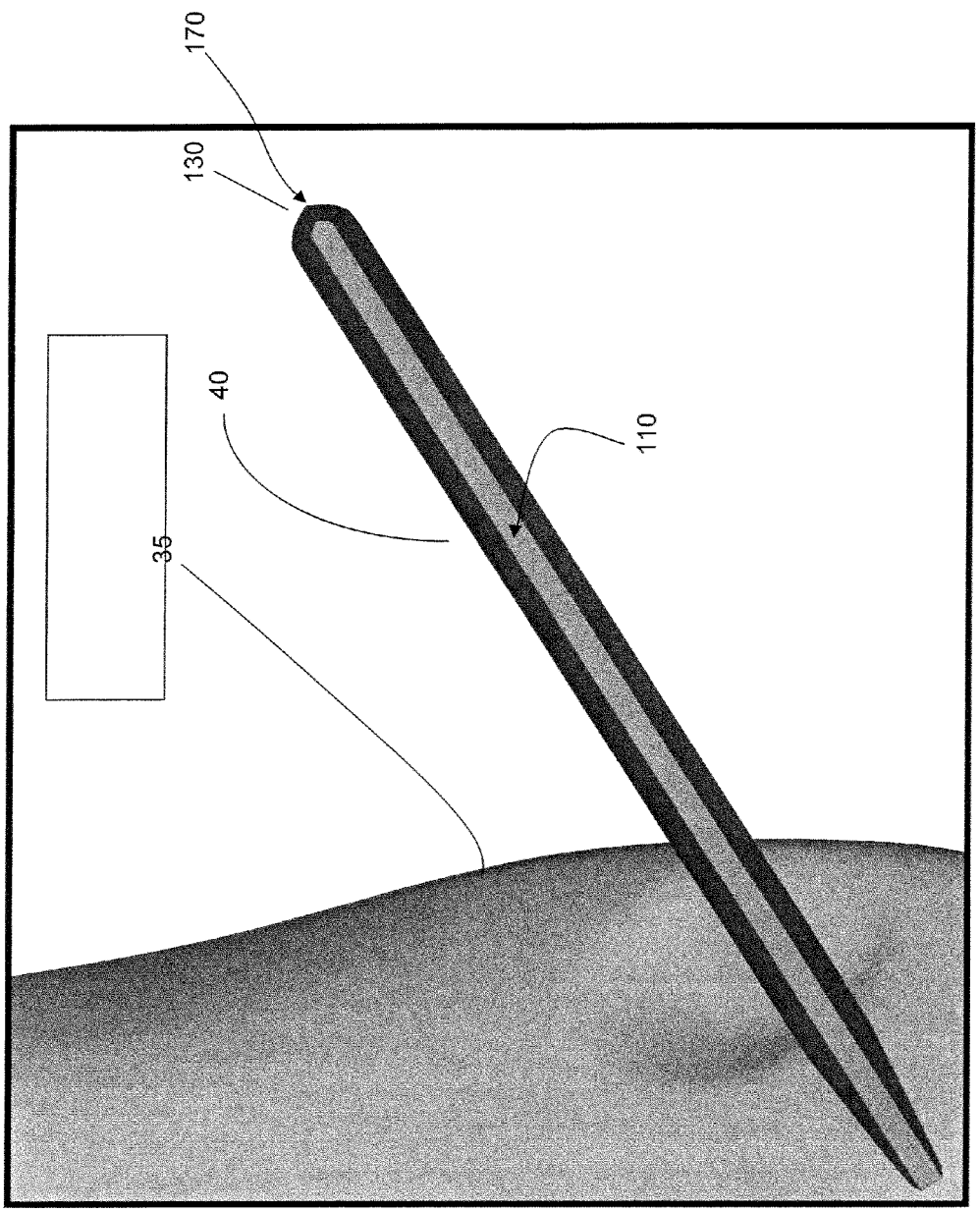
FIG. 6 illustrates an embodiment of a ruddevator as viewed from the trailing edge.
Figure 7:
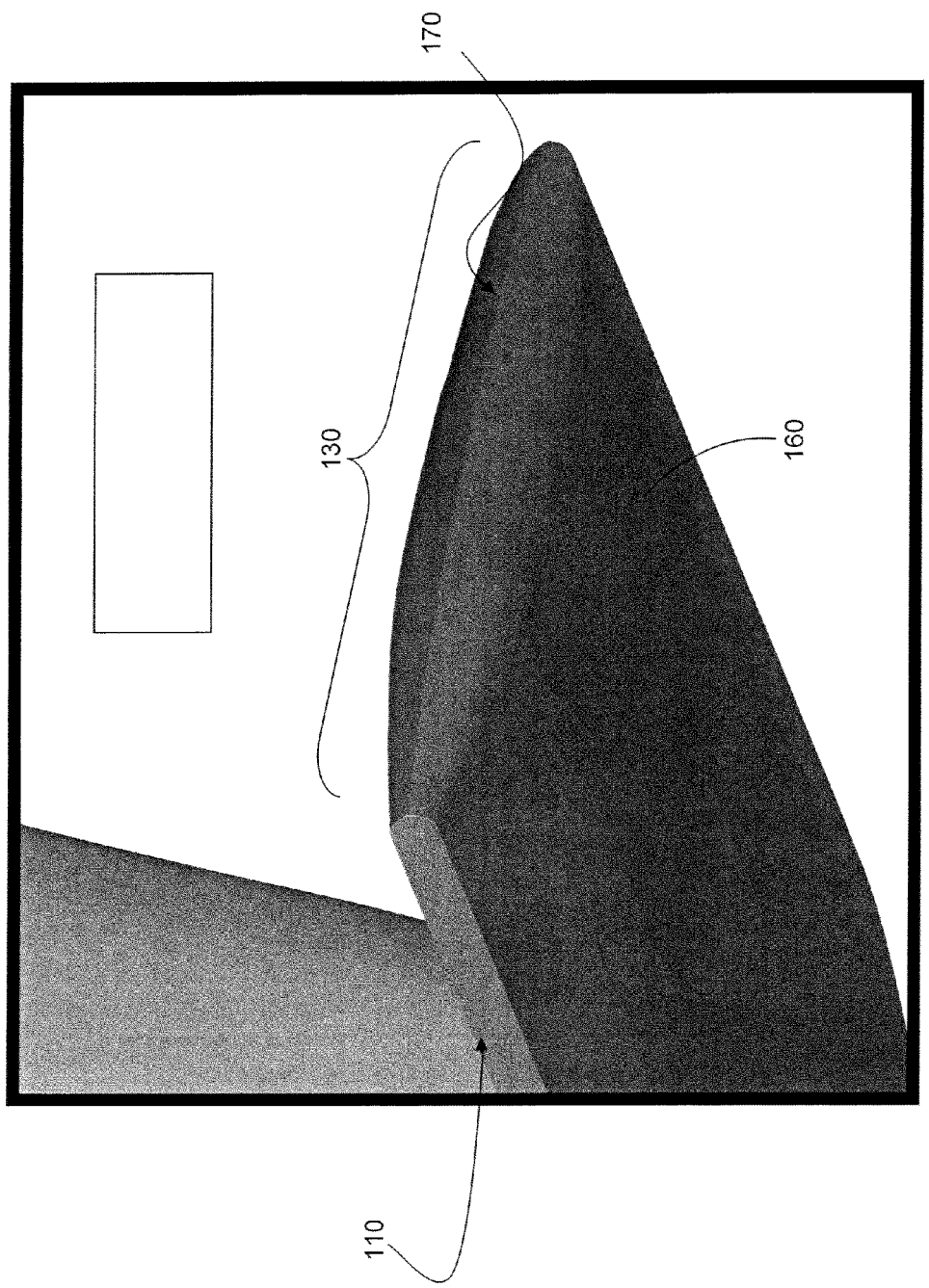
FIG. 7 illustrates an embodiment of a ruddevator as viewed from behind the trailing edge and from the lower surface.

In a further embodiment, the ruddevator 40 comprises a chine 170 as shown in FIGS. 5 though 7, located along the raked wing tip 130. The chine 170 comprises a small radius intersection of surfaces (an angled lateral edge) that extends along the length of the wingtip 130 and more preferably may be described as two contoured surfaces intersecting a right angle where the intersection may have a radius of curvature of approximately 0.125-inch. As is shown in FIGS. 8 and 8a, the chine is located along the chord plane wing tip preferably half way between the upper and lower surface. Preferably this intersection occurs at the center line thickness of the ruddevator. For angles of attack greater than approximately 7 degrees, the chine helps initiate a lift-producing vortex on the wingtip edge at any flight speed. As the airfoil flies at a high angle of attack, the chine 170 continues to maintain and stabilize the vortex produced on the ruddevator surface.

The resultant effects of the preferred embodiment features are improved aerodynamic forces to provide greater control authority to the movement of a refueling boom during a refueling operation and to increase the control of the ruddevators 40 at extremity positions along the refueling envelope 70 during flight, as depicted in FIG. 3. The aerodynamic forces provided by a preferred embodiment of the ruddevators 40 can be represented by Computational Fluid Dynamic (CFD) pressure coefficient plots for given aerodynamic conditions. FIGS. 10 and 11 show plots of the pressure coefficient along the upper and lower surface, respectively, of a typical ruddevator used in aerial refueling and an embodiment of the disclosure. The stream lines on the figures indicate the flow at the bottom of the boundary layer along the ruddevator surface. Where lines converge is indicative of flow separation along the ruddevator surface. The lines diverging from the flow separation area indicate airflow that is reattaching along the surface as it moves toward the trailing edge wingtip as a result of a vortex generated on the ruddevator surface. The shaded areas provide pressure coefficient data. FIG. 10 shows results of CFD data plots of the upper surfaces of a conventional ruddevator (FIG. 10a) and an embodiment of an improved ruddevator (FIG. 10b). In FIG. 10a, the analyzed test conditions are airspeed of mach 0.84, altitude of 24,458 feet, with the boom positioned at 40 degrees elevation at an azimuth angle of 10 degrees, and the port side ruddevator positioned at a 5 degree angle of attack and the starboard ruddevator positioned at 14 degree angle of attack. This condition is generally known as the furthest position within the boom envelope that is controllable by the operator as the ruddevators are not able to provide additional force to the boom to move the boom to a higher azimuth angle. By way of comparison, FIG. 10b shows an embodiment of a ruddevator with similar analyzed test conditions with airspeed of mach 0.84, altitude of 24,458 feet, and the boom positioned at 40 degrees elevation. However the azimuth angle of the boom is at 15 degrees, with the port side ruddevator positioned at a 5 degree angle-of-attack and the starboard ruddevator positioned at 21 degree angle-of-attack. In FIG. 11, the pressure coefficient plots are shown for the lower surface for the same analysis conditions as stated for FIGS. 10a and 10b. The CFD results indicate that the embodiment of the disclosure produces improved aerodynamic flow over the ruddevator surface enabling increased forces to the boom and thus increasing the ability to move and control the boom to positions of the boom envelope not typically reachable under certain flight conditions with traditional ruddevators.

The method and aerodynamic control system for the air-to-air refueling system disclosed herein allows an aerial refueling tanker aircraft to more continuously and thus more efficiently and completely transfer fuel to a receiving aircraft by providing ruddevators capable of producing greater aerodynamic forces attached to the refueling boom for moving the boom throughout the refueling envelope. Both the system and the method for air-to-air refueling disclosed herein enable improved boom control to achieve air-to-air refueling in a more expeditious and efficient manner and prevent premature disconnects, particularly at the extremities of the envelope.

Those skilled in the art will appreciate that various adaptations and modifications of the just-described preferred embodiments may be configured without departing from the scope and spirit of the disclosure. Therefore, it is to be understood that, within the scope of the appended claims, the disclosure may be practiced other than as is specifically described herein.

What is claimed is:

1. A ruddevator configured to couple to a refueling boom, the ruddevator comprising:
an actuator shaft having a diameter in a range of 85% to 99% of a thickness of the ruddevator, wherein the actuator shaft inserts into a root of the ruddevator, and wherein a center longitudinal axis of the actuator shaft is positioned within a range of 30-50% of a distance from a leading edge of the ruddevator to a trailing edge of the ruddevator at the root;
a wingtip that is raked to an angle of between 40 and 50 degrees relative to the actuator shaft, the raked wingtip comprising a chine that extends along the raked wingtip, wherein the chine is positioned along the raked wingtip at a center line thickness of the ruddevator, to produce a lift-producing vortex along a surface of the ruddevator proximate the wingtip; and
wherein the trailing edge is truncated over substantially an entire expanse of the trailing edge, the truncated trailing edge causing a non-convergence of an upper surface and a lower surface of the ruddevator, wherein the trailing edge has a thickness in a range of one percent to three percent of a chord length of the ruddevator,
wherein the leading edge and the trailing edge are both swept at an angle within a range of 0-10 degrees relative to the actuator shaft.

2. The ruddevator of claim 1, wherein the actuator shaft is located within the ruddevator and extends to a position outside the ruddevator.

3. The ruddevator of claim 1, wherein the leading edge and the trailing edge are swept at approximately 5 degrees relative to the actuator shaft.

4. The ruddevator of claim 1, wherein the ruddevator wingtip is raked 45 degrees to the actuator shaft.

5. The ruddevator of claim 1, wherein the wingtip rake begins along the leading edge at approximately 40% of a length of the ruddevator as measured from an inboard edge of the ruddevator.

6. A refueling device for an aerial refueling aircraft, the refueling device comprising:

a refueling boom;

an aerodynamic control system for positioning the boom within a refueling contact envelope, the control system comprising a pair of ruddevators coupled to the boom;

wherein each of the ruddevators includes:

an actuator shaft having a diameter in a range of 85% to 99% of a thickness of the ruddevator;

a wingtip that is raked to an angle of between 40 and 50 degrees relative to the actuator shaft;

a chine positioned along the raked wingtip at a center line thickness of the ruddevator and extending along the raked wingtip to produce a lift-producing vortex along a surface of the ruddevator proximate the raked wingtip; and a trailing edge that is truncated over substantially an entire expanse of the trailing edge, the truncated trailing edge causing a non-convergence of an upper surface and a lower surface of the ruddevator, wherein the trailing edge has a thickness in a range of one percent to three percent of a chord length of the ruddevator, wherein a leading edge of the ruddevator and the trailing edge are both swept at an angle within the range of 0-10 degrees relative to the actuator shaft.

7. The refueling device of claim 6, wherein the actuator shaft is located within the ruddevator and positioned such that a center longitudinal axis of the actuator shaft is positioned between 30% and 50% of a chord length of the ruddevator as measured from the leading edge at a root of the ruddevator.

8. The refueling device of claim 6, further comprising a two-axis gimbal support configured to couple the refueling boom to the aircraft.

9. The ruddevator of claim 6, wherein the ruddevator is configured to induce vortex-generated lift on a surface of the ruddevator at subsonic and transonic airspeeds.

* * * * *